(12) United States Patent
Raccah et al.

(10) Patent No.: US 7,937,293 B2
(45) Date of Patent: *May 3, 2011

(54) SYSTEM TO PROVIDE BUYER WANTED REQUEST LISTINGS

(75) Inventors: David Raccah, San Jose, CA (US); Leonard Robert Speiser, Redwood City, CA (US); Edward O'Neil Garcia, Redwood City, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,668

(22) Filed: Apr. 12, 2010

(65) Prior Publication Data
US 2010/0198702 A1 Aug. 5, 2010

Related U.S. Application Data

(62) Division of application No. 10/536,076, filed on Nov. 30, 2004, now Pat. No. 7,698,169.

(51) Int. Cl.
G06Q 30/00 (2006.01)

(52) U.S. Cl. .................... 705/26.1; 705/27.1

(58) Field of Classification Search .............. 705/26, 705/27, 26.1, 27.1
See application file for complete search history.

(56) References Cited

U.S. PATENT DOCUMENTS

| | | | |
|---|---|---|---|
| 5,032,989 | A | 7/1991 | Tornetta |
| 5,283,731 | A | 2/1994 | Lalonde et al. |
| 5,584,025 | A | 12/1996 | Keithley et al. |
| 5,664,115 | A | 9/1997 | Fraser |
| 5,717,989 | A | 2/1998 | Tozzoli et al. |
| 5,736,977 | A | 4/1998 | Hughes et al. |
| 5,754,850 | A | 5/1998 | Janssen |
| 5,794,207 | A | 8/1998 | Walker et al. |
| 5,794,210 | A | 8/1998 | Goldhaber et al. |
| 5,812,670 | A | 9/1998 | Micali |
| 5,818,836 | A | 10/1998 | DuVal |
| 5,884,272 | A | 3/1999 | Walker et al. |
| 5,890,138 | A | 3/1999 | Godin et al. |
| 6,061,660 | A | 5/2000 | Eggleston et al. |
| 6,131,087 | A | 10/2000 | Luke et al. |
| 6,199,050 | B1 | 3/2001 | Alaia et al. |
| 6,230,188 | B1 | 5/2001 | Marcus |
| 6,253,188 | B1 | 6/2001 | Witek et al. |
| 6,272,467 | B1 | 8/2001 | Durand et al. |
| 6,574,608 | B1 | 6/2003 | Dahod et al. |
| 6,594,633 | B1 | 7/2003 | Broerman |
| 6,665,389 | B1 | 12/2003 | Haste, III |
| 6,684,196 | B1 | 1/2004 | Mini et al. |
| 6,704,716 | B1 | 3/2004 | Force |

(Continued)

OTHER PUBLICATIONS

"U.S. Appl. No. 09/802,719, Response filed Dec. 8, 2008 to Final Office Action mailed Aug. 8, 2008", 14 pgs.

(Continued)

Primary Examiner — Amee A Shah
(74) Attorney, Agent, or Firm — Schwegman, Lundberg & Woessner, P.A.

(57) ABSTRACT

A system comprises a buyer request creation module to receive a buyer request listing, the buyer request creation module automatically to determine a listing category for the buyer request listing. A buyer request searching module locates a buyer request listing corresponding to a search criteria. A buyer request response module adds a response to the buyer request listing, the response comprising a reference to a listing for an item offered for sale on the system.

20 Claims, 10 Drawing Sheets

U.S. PATENT DOCUMENTS

| | | |
|---|---|---|
| 6,732,080 B1 | 5/2004 | Blants |
| 7,191,147 B2 | 3/2007 | Heene et al. |
| 7,191,176 B2 | 3/2007 | McCall et al. |
| 7,246,067 B2 | 7/2007 | Austin et al. |
| 7,302,404 B2 | 11/2007 | Solomon |
| 7,359,498 B2 | 4/2008 | Faber et al. |
| 7,386,508 B1 | 6/2008 | Walker et al. |
| 7,698,169 B2 | 4/2010 | Raccah et al. |
| 2002/0007340 A1 | 1/2002 | Isaf et al. |
| 2002/0027567 A1 | 3/2002 | Niamir |
| 2002/0029187 A1 | 3/2002 | Meehan et al. |
| 2002/0029193 A1 | 3/2002 | Ranjan et al. |
| 2002/0038248 A1 | 3/2002 | Mager et al. |
| 2002/0040319 A1 | 4/2002 | Brauer |
| 2002/0042835 A1 | 4/2002 | Pepin et al. |
| 2002/0059228 A1 | 5/2002 | McCall et al. |
| 2002/0147674 A1 | 10/2002 | Gillman |
| 2002/0156672 A1 | 10/2002 | Burko |
| 2003/0004856 A1 | 1/2003 | Brown et al. |
| 2003/0061087 A1 | 3/2003 | Srimuang |
| 2003/0204474 A1 | 10/2003 | Capek et al. |
| 2004/0015416 A1 | 1/2004 | Foster et al. |
| 2004/0093253 A1 | 5/2004 | Iijima |
| 2004/0260621 A1 | 12/2004 | Foster et al. |
| 2005/0216364 A1 | 9/2005 | Jurisic et al. |
| 2005/0283420 A1 | 12/2005 | Bailey et al. |
| 2006/0224490 A1 | 10/2006 | Seth et al. |
| 2006/0277145 A1 | 12/2006 | Raccah et al. |
| 2007/0003038 A1 | 1/2007 | Siegel et al. |
| 2010/0268653 A1 | 10/2010 | Ingraham et al. |

OTHER PUBLICATIONS

"U.S. Appl. No. 09/802,719, Examiner Interview Summary mailed Oct. 28, 2007", 1 pg.

"U.S. Appl. No. 09/802,719, Examiner Interview Summary mailed Dec. 8, 2008", 2 pgs.

"U.S. Appl. No. 09/802,719, Final Office Action mailed May 29, 2007", 12 pgs.

"U.S. Appl. No. 09/802,719, Final Office Action mailed Jul. 22, 2009", 12 pgs.

"U.S. Appl. No. 09/802,719, Final Office Action mailed Aug. 8, 2008", 10 pgs.

"U.S. Appl. No. 09/802,719, Non Final Office Action mailed Mar. 23, 2006", 10 pgs.

"U.S. Appl. No, 09/802,719, Non Final Office Action mailed Dec. 1, 2006", 11 pgs.

"U.S. Appl. No. 09/802,719, Non-Final Office Action mailed Feb. 10, 2009", 15 pgs.

"U.S. Appl. No, 09/802,719, Non-Final Office Action mailed Dec. 31, 2007", 19 pgs.

"U.S. Appl. No. 09/802,719, Response filed Mar. 1, 2007 to Non Final Office Action mailed Dec. 1, 2006", 18 pgs.

"U.S. Appl. No. 09/802,719, Response filed Mar. 31, 2008 to Non-Final Office Action mailed Dec. 31, 2007", 17 pgs.

"U.S. Appl. No. 09/802,719, Response filed May 11, 2009 to Non Final Office Action mailed Feb. 10, 2009", 15 pgs.

"U.S. Appl. No, 09/802,719, Response filed Aug. 21, 2006 to Non Final Office Action mailed Mar. 23, 2006", 18 pgs.

"U.S. Appl. No. 09/802,719, Response filed Sep. 22, 2009 to Final Office Action mailed Jul. 22, 2009", 9 pgs.

"U.S. Appl. No. 09/802,719, Response filed Oct. 29, 2007 to Final Office Action mailed May 29, 2007", 17 pgs.

"Have a Seat: Nexan Network and Respond.com Partner to Create Reverse Auction Site Homeseat.com", *Buisness Wire, New York*, (Feb. 4, 2002), p. 1.

"Respond.com Helps Small Businesses Compete on the Web; Business Wins Customers Without Costly Ad Campaign", (Nov. 12, 1999), p. 1.

"U.S. Appl. No. 09/802,719, Notice of Allowance mailed Mar. 24, 2010", 6 pgs.

"U.S. Appl. No. 09/802,719, Response filed Jan. 11, 2010 to Restriction Requirement mailed Dec. 10, 2009", 9 pgs.

"U.S. Appl. No. 09/802,719, Restriction Requirement mailed Dec. 10, 2009", 6 pgs.

"U.S. Appl. No. 09/920,573, Non Final Office Action mailed Sep. 22, 2006", 19 pgs.

"U.S. Appl. No. 09/920,573, Response filed Jul. 10, 2007 to Non Final Office Action mailed Sep. 22, 2006", 25 pgs.

"U.S. Appl. No. 10/536,076, Advisory Action mailed Oct. 9, 2009", 3 pgs.

"U.S. Appl. No. 10/536,076, Final Office Action mailed Jul. 30, 2009", 15 pgs.

"U.S. Appl. No. 10/536,076, Final Office Action mailed Oct. 16, 2008", 13 pgs.

"U.S. Appl. No. 10/536,076, Non-Final Office Action mailed Jan. 21, 2009", 16 pgs.

"U.S. Appl. No. 10/536,076, Non-Final Office Action mailed May 15, 2008", 17 pgs.

"U.S. Appl. No. 10/536,076, Notice of Allowance mailed Nov. 25, 2009", 20 pgs.

"U.S. Appl. No. 10/536,076, Response filed Mar. 24, 2008 to Restriction Requirement mailed Feb. 22, 2008", 8 pgs.

"U.S. Appl. No. 10/536,076, Response filed Apr. 21, 2009 to Non Final Office Action mailed Jan. 21, 2009", 11 pgs.

"U.S. Appl. No. 10/536,076, Response filed Jul. 10, 2008 to Non-Final Office Action mailed May 15, 2008", 16 pgs.

"U.S. Appl. No. 10/536,076, Response filed Sep. 30, 2009 to Final Office Action mailed Jul. 30, 2009", 10 pgs.

"U.S. Appl. No. 10/536,076, Response filed Dec. 16, 2008 to Final Office Action mailed Oct. 16, 2008", 12 pgs.

"U.S. Appl. No. 10/536,076, Restriction Requirement mailed Feb. 22, 2008", 7 pgs.

"U.S. Appl. No. 11/095,934, on-Final Office Action mailed Jul. 30, 2008", 16 pgs.

"U.S. Appl. No. 11/158,916, Non-Final Office Action mailed Jan. 22, 2010", 8 pgs.

"U.S. Appl. No. 11/158,916, Non-Final Office Action mailed Dec. 29, 2008", 5 pgs.

"U.S. Appl. No. 11/158,916, Response filed Mar. 30, 2009 to Non Final Office Action mailed Dec. 29, 2008", 11 pgs.

"U.S. Appl. No. 12/762,504, Preliminary Amendment mailed May 10, 2010", 3 pgs.

"EHarmony Expert Guidance", Home page plus communication guidelines information, [Online]. Retrieved from the Internet: <URL: http://www.eharmony.com>, (Copyright 2000-2005), 4 p.

"Match.com Overview and Communication", Home page and communication explanation., [Onli, (Copyright 2005), 8 p.

"Ziprealty", Homepage, real estate listing and contact information for real estate agent, [Online]. Retrieved from the Internet: <URL: http://www.ziprealty.com>, (Copyright 1999-2005), 8 p.

Michael, Fickes, "Waste Web", Overland Park, 31, (2000), 13 pp.

SYSTEM TO PROVIDE BUYER WANTED REQUEST LISTINGS

CROSS REFERENCE TO RELATED APPLICATION(S)

The present application is a divisional of U.S. Ser. No. 10/536,076, filed on Nov. 30, 2004 now U.S. Pat. No. 7,698,169, which is herein incorporated by reference in its entirety.

TECHNICAL FIELD

Embodiments of the present application relates generally to the technical field of commerce automation and, in one exemplary embodiment, to methods and systems to provide wanted ad listings within an e-commerce system.

BACKGROUND

Electronic commerce that utilizes the Internet to sell goods and services to customers has been increasing in its scope and scale at increasing rates. Merchants and other sellers of goods and services are increasingly in search of new mechanisms to locate interested buyers of these offered goods and services. At the same time, buyers using the Internet are similarly in need of more efficient and more effective mechanisms to locate sellers who are offering the goods and services of interest to these buyers.

One set of electronic commerce systems have permitted sellers to list items for sale on web servers that may be searches by interested buyers. These commerce systems, in many examples, offer auction listing and related sales assistance services to connect interested buyers with sellers offering the goods and services for sale. Sellers typically post listing for items that are available for searching by the buyers. These searches may operate as keyword searches on the item titles and item descriptions contained in the listings. These listings may also be organized into categories of similar items that may be browsed as buyers attempt to locate items of interest.

In many cases, buyers have difficulty in locating desired items from the large number of items contained in the listing. This difficulty occurs because of an inability to locate items using keyword searches. Sellers and buyers may use different terminology to describe the items. Search engines and related search strategies are typically simple matching of keywords that do not utilize more complex Boolean operations that may be used in more complex search systems. Buyers may not locate an item by browsing listings as well when sellers and buyers identify different categories are representing the items of interest.

In addition to problems with searching, many sellers do not list all of the items that they may possess. Sellers may not believe that a buyer may want to purchase the item. Additionally, listing fees and related charges may discourage sellers from posting listings when a low interest in the item exists. If these items are not listed, interested buyers cannot place bids and/or make offers to purchase the items from sellers wishing to get rid of the items.

These limitations of existing commerce systems limit the effectiveness of these systems to buyers and sellers as well as limit the number of listing posted on these systems. New mechanisms to connect interested buyers and sellers who use these commerce systems may address these limitations and thus increase on-line sales and corresponding profits for these sellers and commerce system operators.

DETAILED DESCRIPTION

A method and system to provide wanted ad listings within an e-commerce system are described. In the following description, for purposes of explanation, numerous specific details are set forth in order to provide a thorough understanding of the present invention. It will be evident, however, to one skilled in the art that the present invention may be practiced without these specific details.

Figure 1:
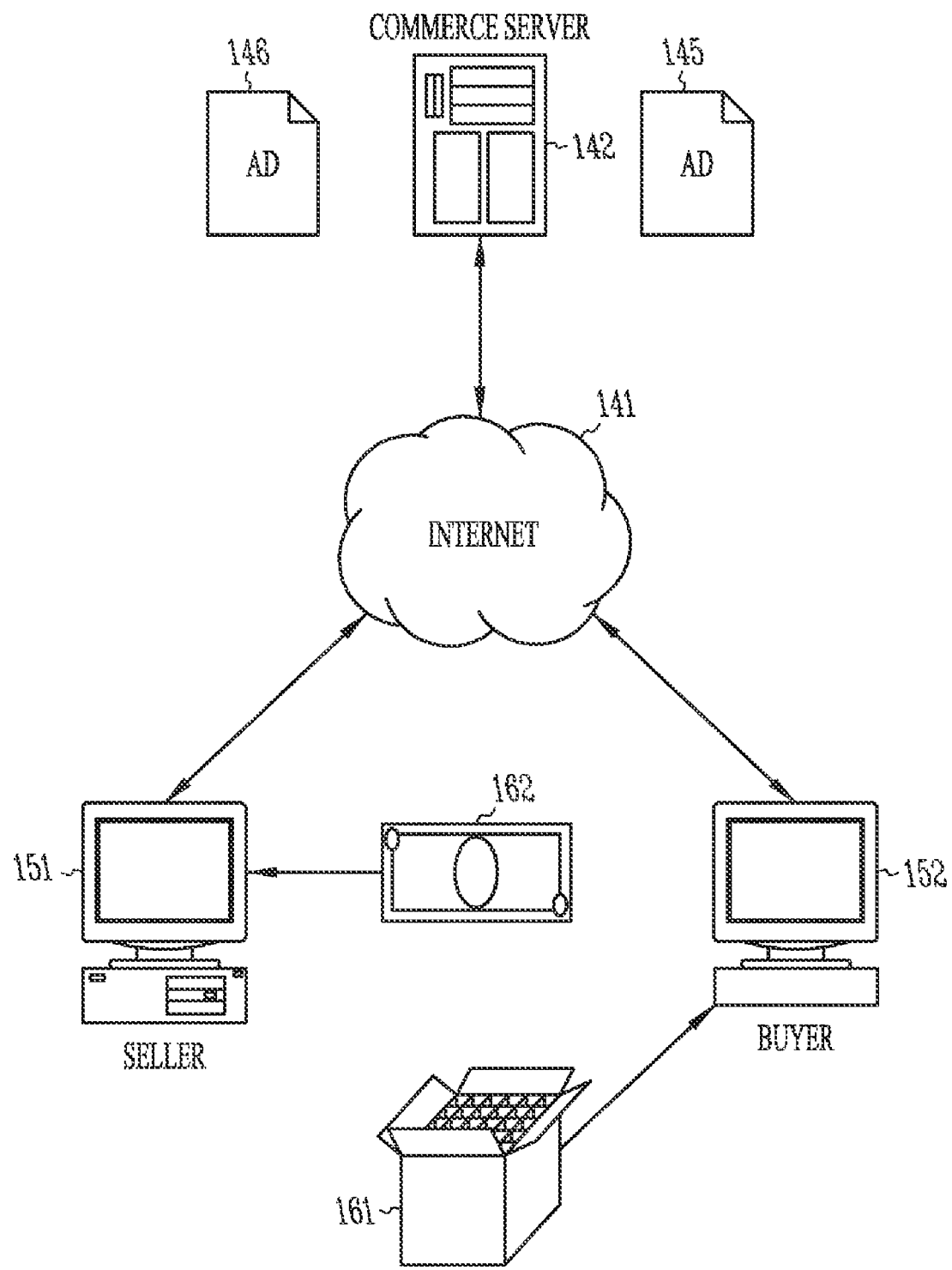
FIG. 1 is a network diagram depicting a system having a client-server architecture in accordance with one exemplary embodiment of the present invention.

FIG. 1 is a network diagram depicting a system having a client-server architecture in accordance with one exemplary embodiment of the present invention. A seller 151 offers goods or services 161 for sale by posting a listing 145 for these items 161 on a commerce server 142 which may be accessed by via Internet 141. An interested buyer 152 searches commerce server 152 to locate listing 145 and responds to the listing in an attempt to purchase goods 161 from seller 151. If listing 145 corresponds to an on-line auction for goods 161, buyer 152 makes a bid on these goods. If listing 145 permits an item to be purchase immediately for a fixed price, buyer 152 may complete the transaction by offering the fixed price.

Once the transaction is consummated, buyer 152 sends payment 162 to seller 151 and seller 151 ships the goods 161 to buyer 152. Payment 162 may be made using on-line payment services, using credit card payments, and using traditional payment mechanisms of checks, payment orders and cash that are sent using a postal service.

When buyer 152 cannot locate an item of interest, buyer 152 may post a wanted ad listing 146 on commerce server 142 in an attempt to find a seller offering the desired item. Seller 151 may search listing of wanted ads 146 to determine if a buyer desires to purchase an item possessed by the seller. Seller 151 responds to wanted ad 146 to inform buyer 152 of an item offered for sale on commerce server 142. When seller 151 locates wanted ad 146, the seller 151 may respond to the wanted ad with information referring to an existing listing present on commerce server 142. This response typically addresses cases where buyer's searches of existing listings have not uncovered the seller's listing 145. Seller 151 may also respond to wanted ad 146 by posting a new listing for the item. This new listing is identical to listing 145 and the item is offered for sale to all buyers using commerce server 142; however, seller 151 posts the new listing in response to wanted ad 146. Seller 151 response references the new listing in the same manner an existing listing is referenced.

When any seller responds to wanted ad 146, buyer 152 may be informed in several ways. First, buyer 152 may review wanted ad listing 146 to view all responses to the ad. From these responses, buyer 152 may make bids on listed items or otherwise conclude purchases of listed items as if the items were located using existing search and browse techniques. Additionally, commerce server 142 may send buyer 152 a notice message, such as an e-mail, instant message (IM), SMS and other similar electronic messages, to inform buyer 152 that a response to wanted ad 146 has been posted. Buyer 152 may respond to these notice messages by reviewing the responses and making any bids and/or offers. Once buyer 152 successfully purchases a desired item, wanted ad 146 may be deleted from commerce server 142.

Commerce server 142 may operate in any well known manner to complete these transactions for items, whether located using searching techniques or whether located using wanted ad listings. User feedback mechanisms, anti-fraud mechanisms, payment services, and commerce server fee collection mechanisms may also be included within commerce server 142 as desired for similar reasons for the inclusion of these features within existing commerce server systems.

In the above embodiment of commerce server 142, a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to create, search and utilize wanted ad listings may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Platform Architecture

Figure 2:
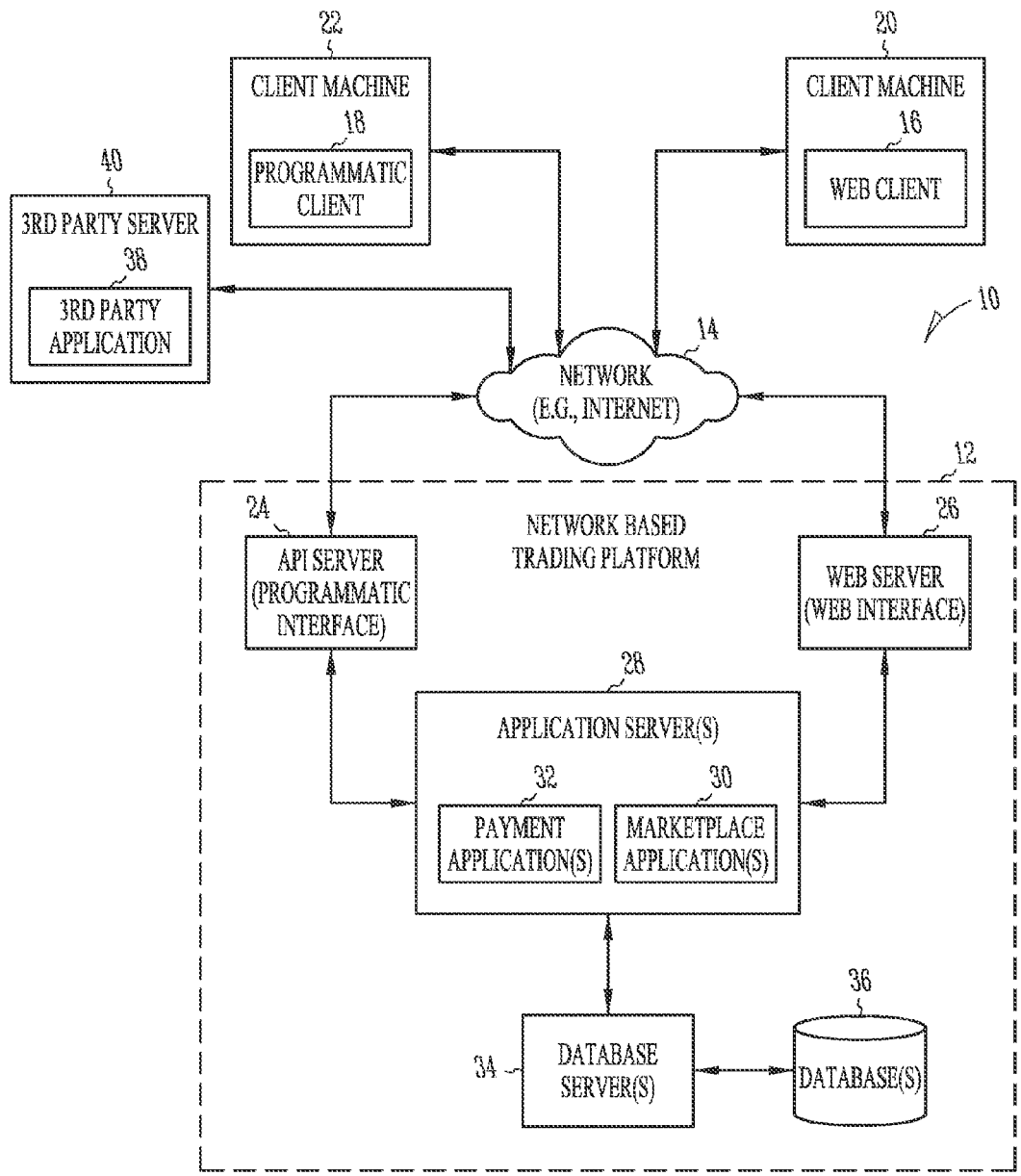
FIG. 2 is a detailed network diagram depicting a system having a client-server architecture in accordance with one exemplary embodiment of the present invention.

FIG. 2 is a network diagram depicting a system 10, according to one exemplary embodiment of the present invention, having a client-server architecture. A commerce server platform, in the exemplary form of a network-based marketplace 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 2 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 2 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 2 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 3:
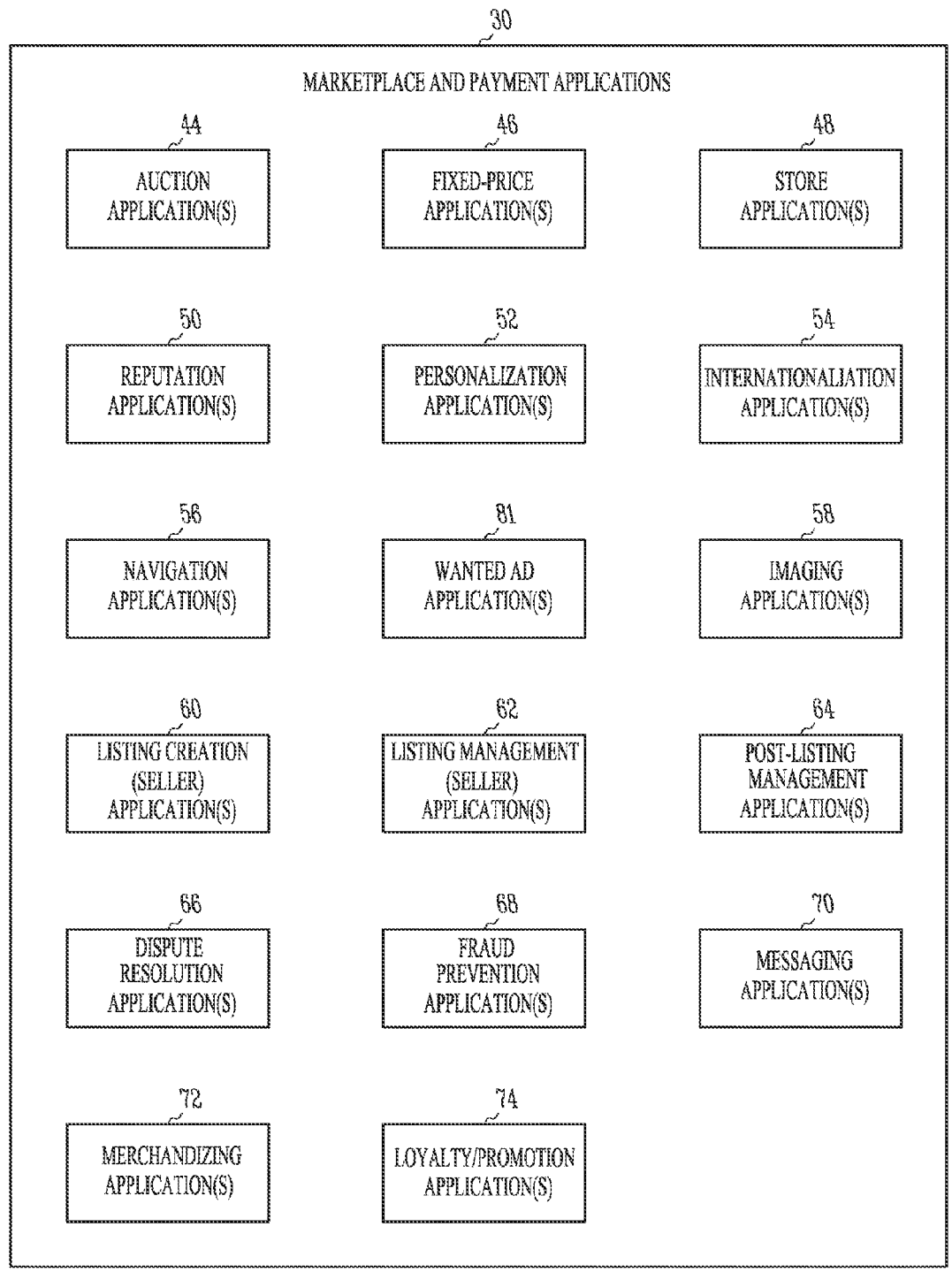
FIG. 3 is a block diagram illustrating multiple marketplace and payment applications in one exemplary embodiment of the present invention.

FIG. 3 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized by using internationalization applications 54, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 72 also operate the various merchandising features that may be invoked by sellers, and may monitor and track the success of merchandising strategies employed by sellers.

Wanted ad applications 81 support the creation, the response to, and the searching of wanted ad listings posted by buyers for items desired to be purchased. Wanted ad applications 81 perform all of the functions disclosed herein to permit these wanted ads to connect interested buyers with sellers offering goods and services for sale.

The network-based marketplace 12 itself, or one or more parties that transact via the marketplace 12, may operate loyalty programs that are supported by one or more loyalty/ promotions applications 74. For example, a buyer may earn loyalty or promotions points for each transaction established and/or concluded with a particular seller, and be offered a reward for which accumulated loyalty points can be redeemed.

Data Structures

Figure 4:
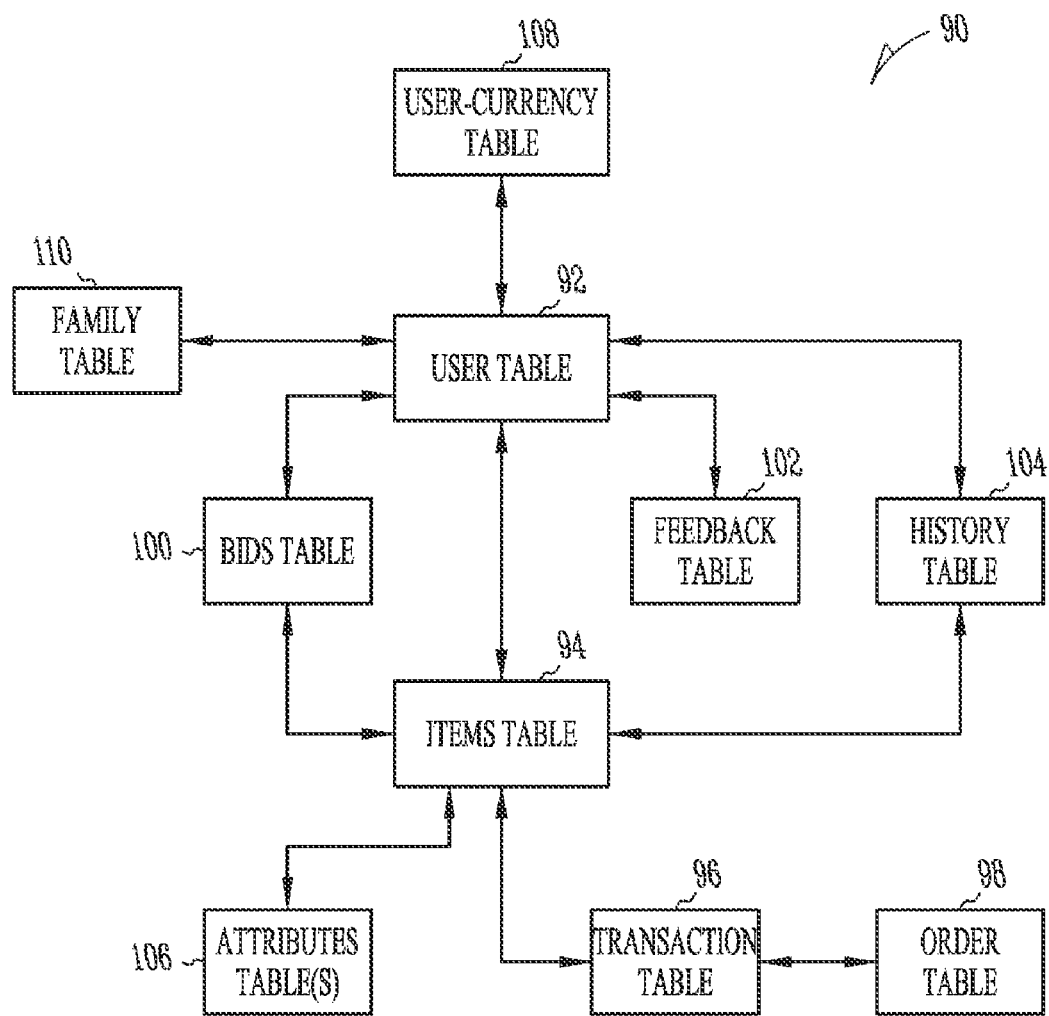
FIG. 4 is a high-level entity-relationship diagram in accordance with an example embodiment of the present invention.

FIG. 4 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller. A user-currency table 108 maintains a record of the currencies which have been used (or preferred) by a party. A family table 110 maintains a record of other transactions which have been involved with family members of a party.

Figure 5A:
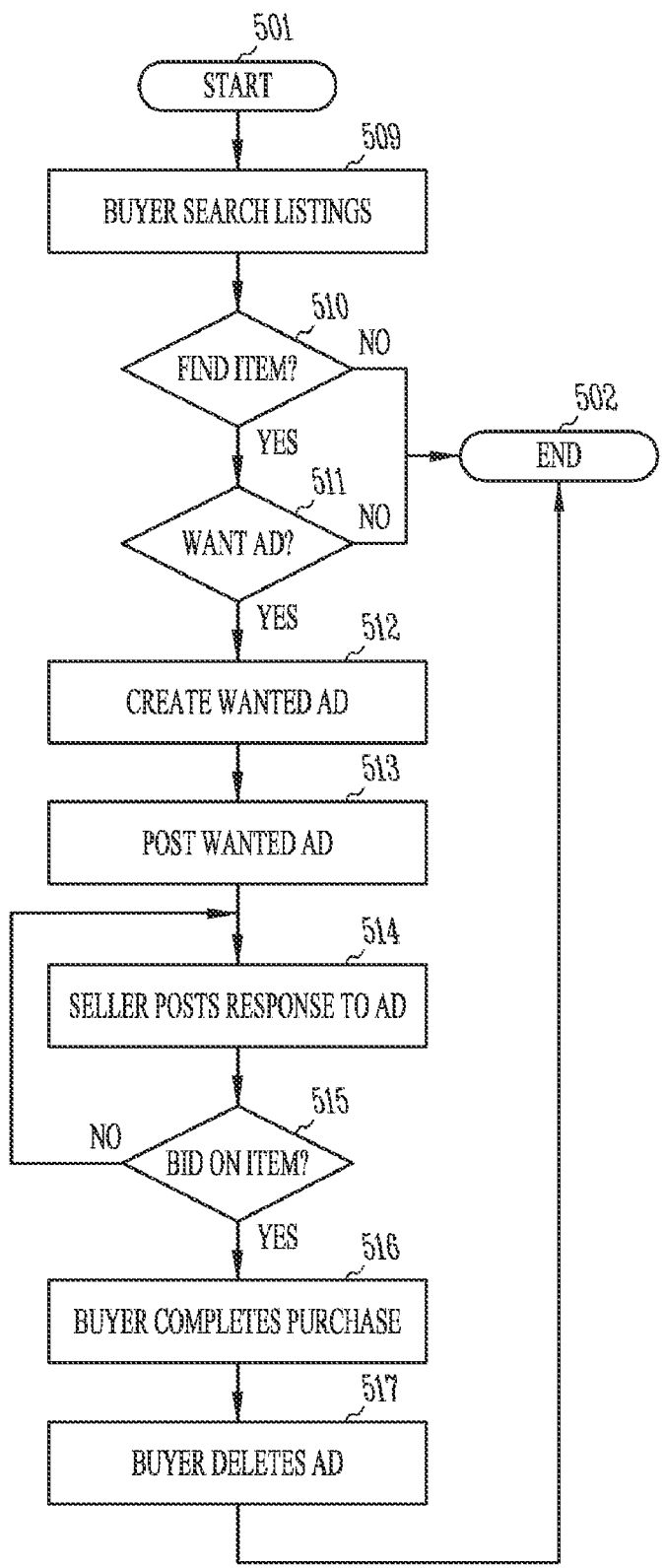
FIG. 5a is a flow diagram of a commerce server providing wanted ads listings according to an exemplary embodiment of the present invention.

FIG. 5a is a flow diagram of a commerce server providing wanted ads listings according to an exemplary embodiment of the present invention. The process starts 501 when a buyer searches existing listings of items offered for sale in operation 509. This search operation may include keyword searches, attribute searches and browsing of existing items organized into categories. A determination is made in operation 510 regarding whether a match for the desired item has occurred. If an item has been found, the process ends 502.

If operation 510 determines that the desired item has not been found, the buyer may create a wanted ad listing in operation 512. If the buyer does not wish to place a wanted ad listing (511), the process ends 502.

In operation 512, the buyer may provide a title for the listing and a description for the desired item. This information becomes the content for the wanted ad. In alternate embodiments, the buyer may include additional information such as photographs, product attributes, and similar information to further specify the desired item. The wanted ad may also be assigned to a product category. This category, or possibly multiple categories, may be specified directly by the buyer if the buyer knows which of the available categories best match the desired item. In alternate embodiments, a best matching category may be automatically selected by commerce server using information contained within the description and/or title of the item provided by the buyer.

Once the wanted ad listing has been specified, the wanted ad 146 is posted onto the commerce server 142 in operation 513. This listing is placed into one or more product categories that permit users of commerce server 142 to locate wanted ads of interest. The listing may include information describing the buyer posting the wanted ad. This information may include any user feedback information contained within commerce server 142 that may permit potential sellers to assess the trustworthiness of the buyer. This information typically does not include contact information for the buyer. A seller responds to the wanted ad by placing a response onto commerce server 142 that contains a listing for an item offered for sale. Buyers respond to these responses on wanted ads by making bids or offers for the listed items. As such, all transactions occur through commerce server 142 rather than through alternate commerce channels.

Sellers may respond to posted wanted ads 146 by providing a reference to a listing for an item offered for sale on commerce server 146. This response may reference a listing already existing on commerce server 146. This response may also reference a new listing created by the seller in response to viewing wanted ad 146. The seller's response containing the reference to the item listing is posted to wanted ad 146 in operation 514. The buyer is informed of the existence of the sellers response and is offered an opportunity to bid on a listed item in operation 515. If the buyer does not wish to make a bid at the present time, the process returns to operation 514 to await another response from a seller.

If the buyer does want to bid on an item, the process continues to operation 516 where the buyer may make a bid and eventually complete the purchase of the desired item. If the seller's listing uses an auction, the buyer would be the highest bidder in order to complete the transaction. If a fixed price sale is offered, the buyer agrees to make the purchase at this fixed price. The transaction is completed with payment being made by the buyer to the seller in any available way, including on-line payment servers offered by commerce server 142. The seller ships the desired goods to the buyer to compete the transaction.\

Once the buyer has obtained the desired item, the buyer may wish to delete the wanted ad listing 146 in operation 517 to remove the wanted ad from commerce server 142. The wanted ad listing 146 is typically removed in order to prevent addition sellers from responding to a wanted ad listing 146 that is no longer valid. In other cases, buyers may wish to purchase multiple copies of an item found using a single listing. In this situation, the buyer may wait to delete the wanted ad listing once all desired copies of the item have been acquired. Commerce server 142 may automatically delete wanted ad listings 146 after a predetermined period of time to eliminate stale listings. Buyers may of course re-list wanted ads as desired. The process ends 502 once the wanted ad listing 146 has been deleted.

Figure 5B:
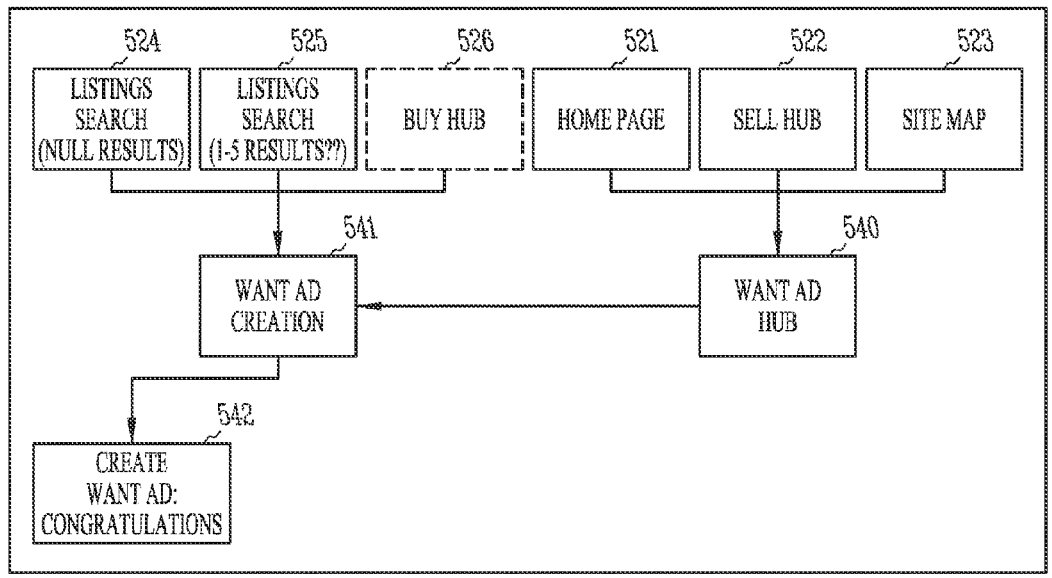
FIG. 5b is another flow diagram of a commerce server providing wanted ads according to an exemplary embodiment of the present invention.

FIG. 5b is another flow diagram of a commerce server providing wanted ad listings according to an exemplary embodiment of the present invention. When commerce server 142 operates as a web server providing buyers with an ability to post wanted ad listings, the commerce server typically presents a set of inter-related web pages that navigate a buyer through the creation of a wanted ad listing. A buyer typically begins by accessing one of several web pages offered by commerce server 142. These web pages include a home page 521, a sell item hub web page 522 and a site map web page 523 offered by commerce server 142. On each of these web pages, a hyperlink or a button containing sufficient instructions that direct the buyer to wanted ad listing hub web page 540. The wanted ad listing hub web page 540 typically contains hyper links and/or buttons containing instructions to re-direct users to various web pages associated with wanted ad listing. These web pages may include search pages, category browsing pages, listing deletion pages, and wanted ad listing creation page 541. The wanted ad listing creation pages 541 is used by buyers to create wanted ad listings by providing the necessary information to describe the item desired. Once this process is created, a wanted ad listing is posted on commerce server 142 and the buyer is re-directed to a create wanted ad listing congratulations page 542 that indicates successful creation of the listing. The buyer may return to wanted ad listing creation page 541 to create additional wanted ad listings if desired.

Buyers may also reach the wanted ad listing creation page 541 from hyperlinks or corresponding web page buttons from other web pages supported by commerce server 142. These pages may include a listing search null result web page 524, a listing search web page having few results 525, and a buy item hub web page 526. The listing search null result web page 524 is typically reached when a buyer performs a search for a desired item in which search terms do not match any item listed on commerce server 142. The web page returned to the buyer informing him or her that no listed item matched the performed search contains a hyperlink or corresponding web page button to take the buyer to the wanted ad listing creation web page 541 as a possible next step in acquiring a desired item. Similarly, a listing search web page having few results 525 may indicate to the buyer that the desired item is not widely available. The fact that only a few listings were found may indicate that beneficial purchase terms may not be easily obtained. As such, placing a wanted ad listing may induce additional sellers to post listings and thus provide more favorable market conditions for the buyer. Finally, the buy item hub web page 526 may include a link to the wanted ad listing creation web page 541 to provide buyers navigating the commerce server web site with a convenient means to create a wanted ad listing from a web page associated with buying items.

In the above embodiment of commerce server 142, a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to create, search and utilize wanted ad listings may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 6:
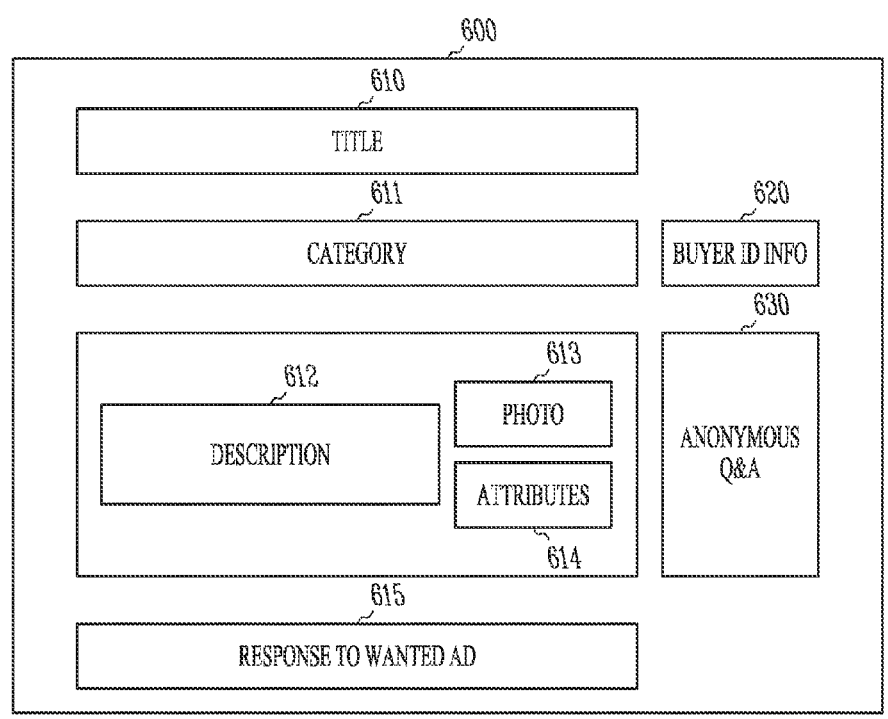
FIG. 6 is a diagram of a wanted ad listing web page according to an exemplary embodiment of the present invention.

FIG. 6 is a diagram of a wanted ad listing web page according to an exemplary embodiment of the present invention. The wanted ad listing web page 600 contains a set of information including a wanted ad listing title 610, a wanted item category entry 611, a wanted item description 612, a set of responses to wanted ad 615, a set of buyer ID information 620, and an anonymous Q&A posting block 630. In alternate embodiments, the wanted ad listing page may also include photographs of the wanted item 613 and wanted item attributes 614.

The wanted ad listing title 610 provides a short description of the wanted item. The title 610 is also used as descriptive text on search result pages for wanted ad searches performed by users of commerce server 142. The wanted item category entry 611 provides an indication of one or more categories of related wanted ad items that may be browsed or used to limit searches performed by users of commerce server 142. The wanted item category typically is one or more of all of the available product categories supported by commerce server 142. Buyers specify the product category listed in this data when the wanted ad listing is created.

The wanted item description 612 contains a textual description of the wanted item as specified by the buyer when the wanted ad listing is created. This information may contain any useful information that the buyer believes accurately describes the wanted item. Sellers of items utilize this description 612 to determine if he or she possesses an item that may satisfy the wanted ad.

The set of responses to wanted ad 615 contain an entry for each response generated from a potential seller. Each response includes a reference, typically in the form of a hyperlink, to a listing on commerce server 142 that is offering an item for sale. The seller enters a response to the wanted ad that is stored in response information 615 that the seller believes may satisfy the buyer's needs. The buyer may obtain the wanted item by making a bid or related offer to buy the wanted item using the referenced listing for the item.

The web page 600 contains the set of buyer ID information 620 useful to provide sellers with confidence that the buyer posting the wanted ad listing is trustworthy. This buyer ID information does not contain information that permits the seller to contact the buyer by any means other than responding to the wanted ad. Commerce server 142 limits the ability of users to contact each other by means other than the posting of responses to wanted ads as a mechanism to ensure that all transactions occur through commerce server 142. This limitation reduces unwanted messages, and related spam messages, as well as ensures that all users of commerce server 142 operate in the same manner, thus ensuring all users act in a fair and well understood manner with each other.

The web page 600 may also contain an anonymous Q&A block 630 in which potential sellers may anonymously post questions to the buyer that help to clarify the item wanted. A hyperlink or similar button permits a seller to post a question to the wanted ad listing. A seller must be a registered user of commerce server 142 in order to post a question. Notice of the posted question may be forwarded to the buyer by electronic message, including e-mail, IM SMS and the like. The buyer may respond to the question by posting an answer on the listing page 600. The buyer utilizes a hyperlink or button to post the response to the question onto the listing page 600 in a similar manner to the sellers.

In an alternate embodiment, a seller may anonymously send the question to the buyer rather than immediately post the question to the web page 600. The buyer may respond to the question by sending an anonymous message to the seller asking the question. In this alternate embodiment, the buyer may also be presented an option to post the question and subsequent answer to the anonymous Q&A block 630 for all to see. In a final embodiment, the seller may be permitted to anonymously send a question to the buyer using an electronic message. However, the buyer may be limited to respond to the question by posting the answer in the anonymous Q&A block 630. Any combination of these embodiments may be possible without deviating from the scope of the present invention as recited in the attached claims. Using a series of questions and answers available to all who view the web page listing, an accurate understanding of the item wanted by the buyer may be obtained.

Wanted ad listing web page 600 may include photographs of wanted items 613 if such photographs assist buyers and sellers identify if items offered for sale meet buyer's desires. These photographs may especially be useful when buyers are attempting to obtain an item that is part of a larger set of items in which a purely textual description may not be adequate. Similarly, web page 600 may also contain a set of wanted item attributes 614 that may more fully describe the wanted item. Foe example, many items may possess an attribute that is offered in a plurality of values, e.g. a music player may be available in a variety of colors and a variety of storage sizes. The attribute information 614 may be useful for the buyer to specify wanted item to be a "pink music player" or a 10 GB music player or smaller from all of the possible variations of music players. The attribute information 614 permits buyers and sellers to communicate desires more effectively. The attribute information 614 may also be useful in searching wanted ad listings. For example, a category for music players may exist within commerce server 142 is a sufficient number of listings would make use of such a category useful to buyers and sellers. When an item is placed into this category, commerce server 142 may provide well know attributes for music players, such as color and storage size, to be specified by the buyer when the listing is created. This attribute information 614 is then provided on the listing 600 as part of the want item description.

In the above embodiment of commerce server 142, a client-server processing system in which communications between the client and server occur as a sequence of web pages provided by a web server that are rendered on the client computer as HTML documents processed within a web browser. One such web page is disclosed in FIG. 6. One skilled in the art will recognize that a client-server distributed processing application that obtains the above described data needed to create a wanted ad listing if FIG. 6 may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 7:
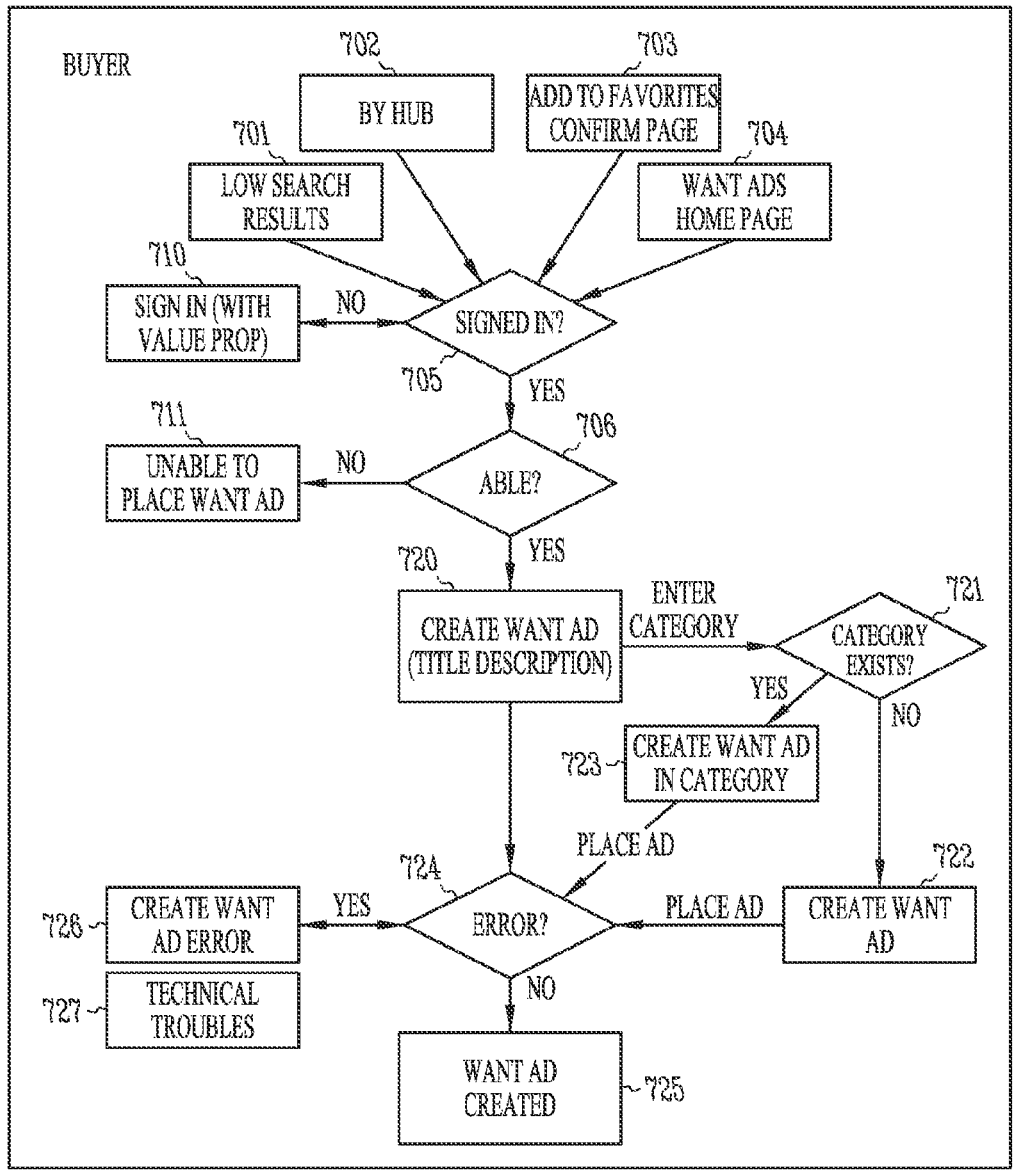
FIG. 7 is a flow diagram of a sequence of web pages provided to a buyer to utilize a wanted ad listing according to an exemplary embodiment of the present invention.

FIG. 7 is a flow diagram of a sequence of web pages provided to a buyer to utilize a wanted ad listing according to an exemplary embodiment of the present invention. The process of a buyer creating a wanted ad listing 600 begins with the buyer starting a one of a number of web pages. These web pages include a low search result web page 701, a buy item hub web page 702, an add to favorite confirm page 703, and a wanted ad listing home page 704. On each of these web pages, the buyer uses a hyperlink or similar button containing instructions to re-direct the buyer to create a wanted ad listing web page. Before the buyer may create a wanted ad listing, commerce server determines if the buyer is signed into the commerce server in operation 705. Buyers, as users of commerce server 142, possess unique user accounts that typically use a user ID and corresponding password to authenticate a buyer to commerce server 142. Before a wanted ad listing may be created, the buyer must log into commerce server 142 to identify the buyer to the server.

If server 142 determines that the buyer is not logged in, the buyer may log into the server in operation 710 before continuing. Server 142 determines whether the buyer is able to log into the server in operation 706. If the buyer is not able to log in, either because the user ID and corresponding password do not match or because the user account for the buyer in not activated for some reason, the processing ends 711 without creation of a wanted ad listing. If server 142 determines that the buyer is able to log in, wanted ad listing of FIG. 6 is created in operation 720. In operation 720, the wanted item description information is provided. This provided information may or may not include specification of product category for the item. If a category is specified, processing continues to operation 724 where error in the proposed listing are checked.

If the provided information for the product in operation 720 does not include a category, a proposed category is determined and offered to the buyer for selection. In one embodiment, buyer can either select a top level category or define a specific low-level category. In the first case, the similar items search will determine the appropriate sub-category based on the title and description. A frequency distribution of matching items may be used to determine a best category. If no appropriate sub-category is found in the selected top-level category, if the commerce server 142 finds a strong match in a different high-level category, the listing will file it there.

In an alternate embodiment, a proposed category is determined by performing a search for similar items in existing listings. Matching searches of relevant terms used within the product description 614 and/or the title 610 may be made against all existing listings. Categories proposed for use with the particular wanted ad listing correspond to one or more categories containing the largest number of matching items. A frequency distribution for the categories of matching items from the above matching search results is generated. The category having the highest frequency of matching items from the search is proposed as the category to be used. Operation 721 determines if a proposed category exists. If so, a wanted ad listing is created using that category in operation 723 before error checking is performed in operation 724. If no proposed category may be determined in operation 721, the wanted ad is created in operation 722. In operation 722, a user may be queried with possible categories from which one or more categories may be selected before error checking occurs.

Operation 724 determines if the created wanted ad contains errors. If it does, a error message web page is created in operation 726 that is presented to the buyer. The buyer may correct any errors and resubmit the wanted ad listing using the process described above. Otherwise, technical assistances, help, and user support may be provided to the buyer in operation 727.

Operation 724 determines that no errors exist in a wanted ad listing as proposed, the wanted ad listing is created and posted on commerce server 142 in operation 725 as the process ends.

In the above embodiment of commerce server 142, a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to create a wanted ad listings may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 8:
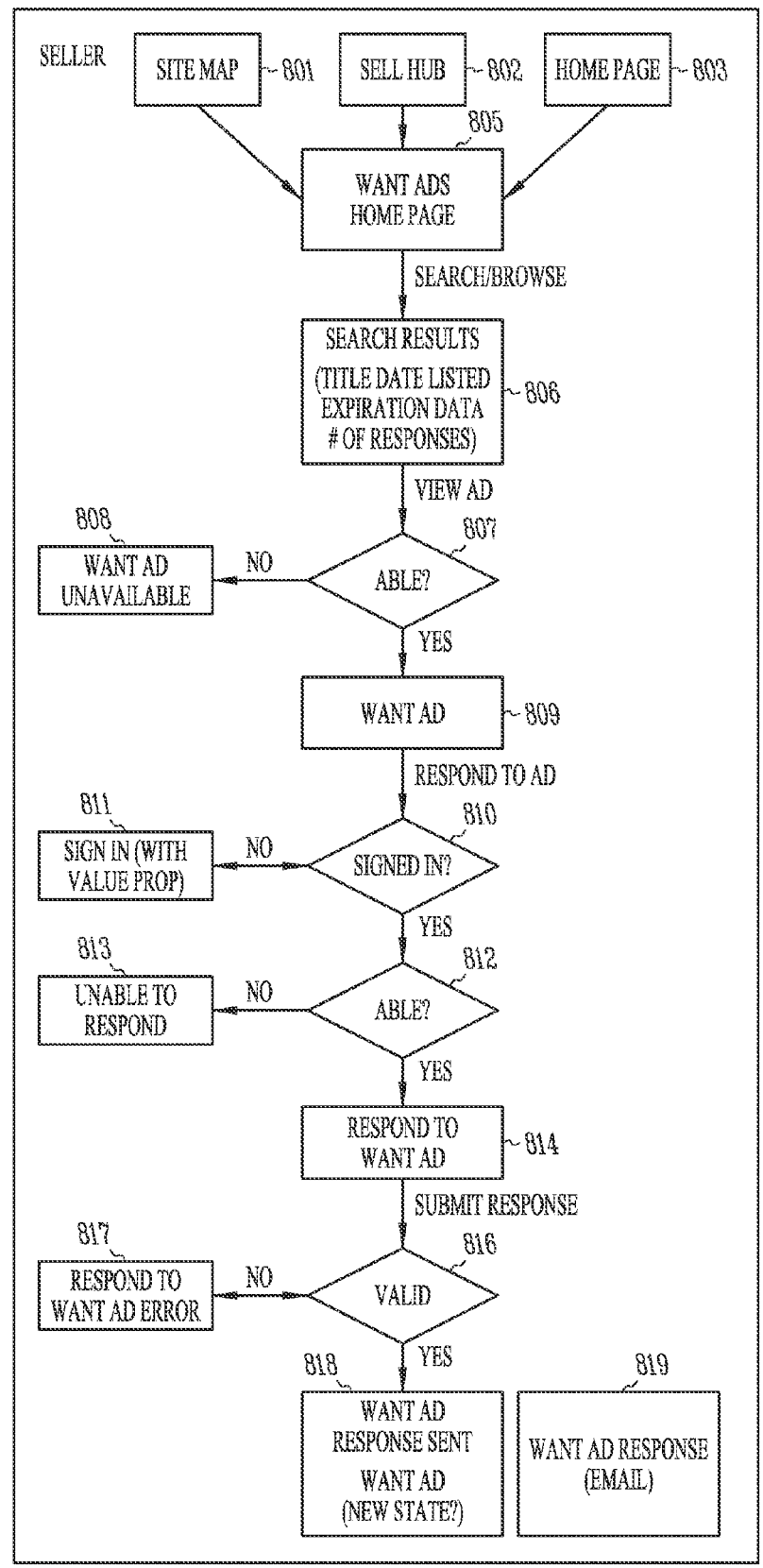
FIG. 8 is a flow diagram of a sequence of web pages provided to a seller to respond to a wanted ad listing according to an exemplary embodiment of the present invention.

FIG. 8 is a flow diagram of a sequence of web pages provided to a seller to respond to a wanted ad listing according to an exemplary embodiment of the present invention. The seller may respond to a wanted ad listing by navigating from one of several web pages including a site map web page 801, a sell item hub web page 802, and a commerce server home page 803. Each of these pages typically contains a hyperlink or similar button containing instructions to re-direct the seller to the wanted ad home page to start the response process. From the wanted ad listing home page 805, the seller indicates that he or she wants to search or browse wanted ad listings using a hyperlink or similar web page button. The seller enters search information, such as keywords for a search, or category information to browse, and is re-directed to a search results page 806. The seller is provided with a listing of wanted ad listings corresponding the type of search performed.

The search results typically correspond to a one line entry for each wanted ad listing found. The entry contains the wanted ad listing title, expiration date for the listing and a number of responses to date. A hyperlink to each listing is also provided. The seller may view a particular listing by activating the hyperlink. Operation 807 determines if the selected listing is available. If not, an unavailable listing message is provided by operation 808. If the listing is available, the listing is provided to the seller in operation 809. The listing contains a hyperlink or similar button to permit the seller to respond to the listing if desired.

In alternate embodiments, sellers may obtain search results in an automated manner. In one automated embodiment, sellers may create saved searches with keywords, categories, and/or attributes used within a search. These saved searches may be periodically run either on a pre-determined schedule or on request by the seller. These searches may automatically generate an electronic message to the sellers when buyers post requests that meet their saved criteria. In a second automated embodiment, Sellers may subscribe (potentially for a fee) to reports that show them the trends in buyers' requests. For example, sellers may receive reports of the trends of frequency of keywords used in ads/posts. From these reports, sellers may determine selling opportunities based on aggregations of the data in wanted ad listings.

In a final embodiment, the commerce server 142 may automatically check to see if wanted ad listing exists for sellers' item listings once sellers have listed an item. If the commerce server finds matches, these matching listings may be sent to the seller in an electronic message, such as an e-mail or instant message. This electronic message may contain a hyperlink that when activated automatically takes the seller to a web page to give them the option of generating responses to the identified wanted ad listings.

Before the seller may respond to the wanted ad listing, the seller must log into commerce server 142. As previously noted, users of commerce server 142 use an userID and password to authenticate themselves to the server. Operation 810 determines if the seller has already logged into the server. If not, the seller may log in using operation 811. Operation 812 determines if the seller is able to log in and if not, the seller is informed of the error in operation 813 before the process ends.

If the seller can log in, the seller responds to the wanted ad listing in operation 814. As noted above, the response is a reference to a listing to sell an item on commerce server 142. Operation 816 determines whether the proposed response from the seller is valid. If not an error message is provided by operation 817. If the response is determined to be valid in operation 816, the seller's response is posted on the wanted ad listing in operation 818 before the processing ends. Operation 819 may also be performed to send a message to the buyer that a response has been posted onto his or her wanted ad listing informing the buyer that a possible item matching the wanted ad listing is now available on commerce server 142.

In the above embodiment of commerce server 142, a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to search and utilize wanted ad listings may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 9:
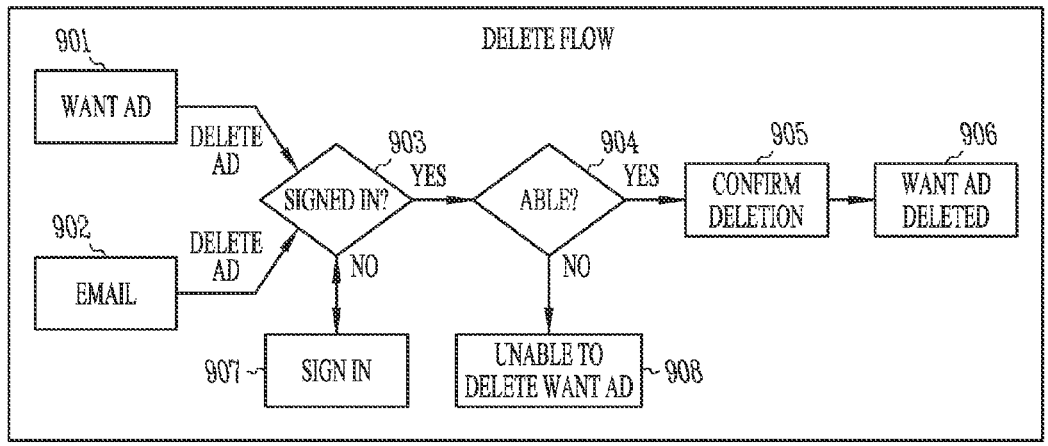
FIG. 9 is a flow diagram of a sequence of web pages provided to a buyer to delete a wanted ad listing according to an exemplary embodiment of the present invention.

FIG. 9 is a flow diagram of a sequence of web pages provided to a buyer to delete a wanted ad listing according to an exemplary embodiment of the present invention. The buyer may delete a wanted ad listing that he or she had previously created at any point in time after creation. Typically, the buyer deletes the listing once the wanted item has been obtained. Wanted ad listings may also be automatically deleted by commerce server 142 after a pre-determined period of time to eliminate stale ads from being found when sellers search the wanted ad listings.

The buyer begins the listing deletion process by utilizing a hyperlink found either on the wanted ad listing itself 901 or within an e-mail 902 received from commerce server 142. Before the wanted ad listing may be deleted, the buyer must log into commerce server 142 using a userID and password. Operation 903 determines if the buyer is logged in. If not, the buyer may log into the server 142 in operation 907 before proceeding. If the buyer has logged into the server 142, operation 904 determines whether the buyer is able to delete the particular wanted ad listing. Only the buyer who created the wanted ad listing may delete listing in question. If the buyer may not delete the listing, an error message is generated to the buyer in operation 908 before the process ends.

If the buyer is permitted to delete the wanted ad listing, confirmation of the desire to delete the listing is obtained from the buyer in operation 905 to prevent inadvertent deletion of listings. Once confirmation of the listing is obtained from the buyer, the listing is deleted from commerce server 142 in operation 906. Notification of the deletion may also be provided to the buyer via e-mail, instant message, SMS or other electronic messaging mechanism.

Figure 10:
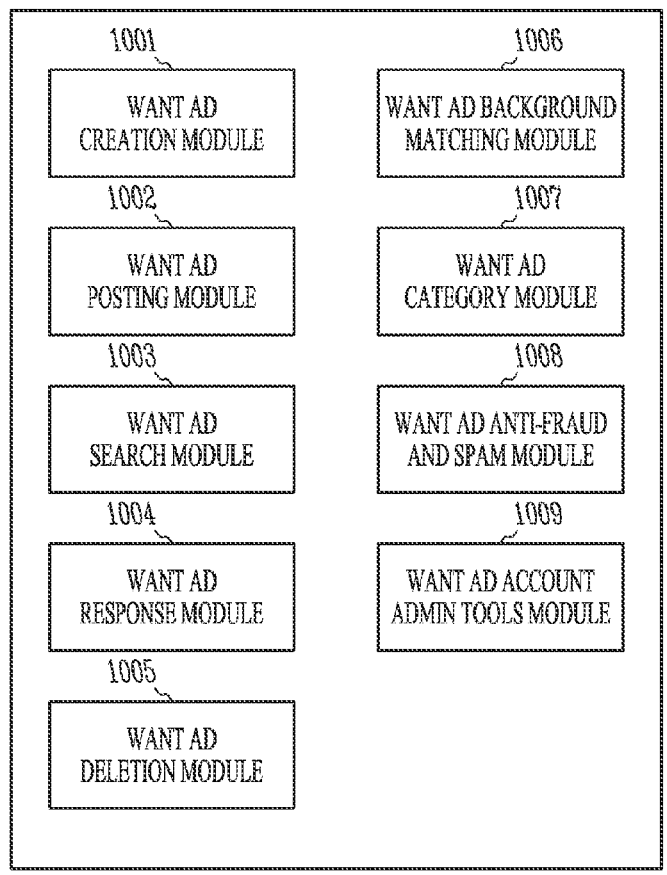
FIG. 10 is a set of processing modules within a commerce server to provide wanted ads according to an exemplary embodiment of the present invention.

FIG. 10 is a set of processing modules within a commerce server to provide wanted ads according to an exemplary embodiment of the present invention. The set of processing module used to provide wanted ad listings within commerce server 142 may include a wanted ad creation module 1001, a wanted ad posting module 1002, a wanted and searching module 1003, a wanted ad response processing module 1004, a wanted ad deletion module 1005, a wanted ad background matching module 1006, a wanted ad category module 1007, a wanted ad anti-fraud and spam module 1008, and a wanted ad account admin tool module 1009. These modules operate together with each other and with other related processing modules to provide for the creation, searching and response to wanted ad listings within a commerce server.

The wanted ad creation module 1001 performs all operations needed to permit a buyer to create a wanted ad listing. This module accepts item description information for the wanted item from a buyer to create the listing. This information includes a title, description and userID information. The module 1001 may also accept photographs and attribute information as part of creation of the listing. The wanted ad creation module 1001 interacts with the wanted ad category module 1007 to select one or more product categories available on commerce server 142 into which the wanted ad listing is placed. The wanted ad creation module 1001 passes the received information to the wanted ad posting module 1002 which posts the listing onto server 142 for use by buyers and sellers.

The wanted and searching module 1003 permits sellers to search or browse existing wanted ad listings to locate listing for items that the seller possesses for possible sale to a buyer. This search may use item categories, keywords, and item attributes as part of a listing search performed by the module 1003.

The wanted ad response processing module 1004 permits sellers to provide a response to wanted ad listings by providing a reference to listing for items for sale on commerce server 142. The listing for items may include existing listings or may permit new items to be listed for reference within a response. In order for a valid response to be posted to a wanted ad listing, the item for sale must be listed by the time the response process has ended.

The wanted ad deletion module 1005 permits the buyer to delete any listings that her or she has posted on commerce server 142. This listing deletion may occur at any time; however, the deletion typically does not occur until the buyer has obtained the wanted item. Commerce server 142 may also delete a wanted ad listing after a pre-determined period of item, such as a month, 90 days or any desired time period to eliminate stale ads from the server. Buyers may re-list any deleted ads if desired.

Commerce server 142 may perform background matching searches for newly listed items offered for sale against wanted ads to assist buyers in finding possible matching listings without the intervention of the seller using the wanted ad background matching module 1006. These possible matches may be included in the wanted ad listing page for use by buyers to find wanted items.

The wanted ad category module 1007 works with the wanted ad creation module 1001 to determine the best category for a new wanted ad listing to be placed when the listing is posted in server 142. This module 1007 finds the best category by matching the item description for the new listing against the posted listings. A frequency distribution of categories of matching items is generated to determine the category with the highest frequency of matching listings. This category is used as a proposed category when the listing is posted The wanted ad anti-fraud and spam module 1008 provides buyers and sellers with communications mechanisms with operators of commerce server 142 to identify and stop any inappropriate actions of users of the server. Particularly, buyers and sellers are typically expected to use the server 142 in its intended manner. When users actions and unwanted communication (i.e. spam) occur, users may inform the operators to stop the offending user from taking further action. Finally the wanted ad account admin tool module 1009 provides buyers and sellers with mechanisms for maintaining and updating user accounts and transaction feedback on the commerce server 142.

Figure 11:
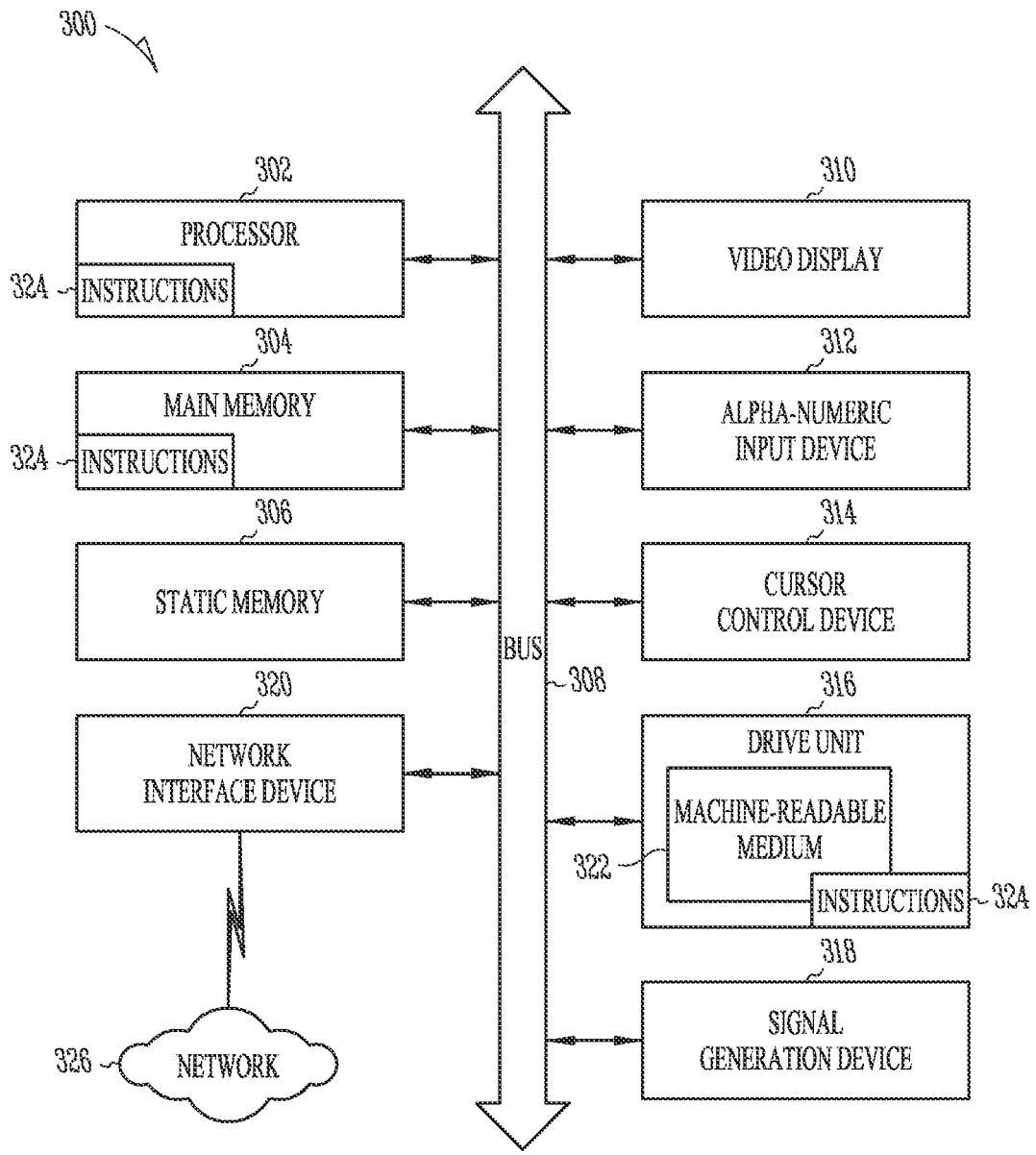
FIG. 11 is a block diagram illustrating a general programmable processing system for use in programmable processing system in accordance with various embodiments of the present invention.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to provide wanted ad listings within an e-commerce system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
one or more processors;
a buyer request creation module executable by the one or more processors to receive a buyer request listing, the buyer request creation module automatically to determine a listing category for the buyer request listing using an item description included in the buyer request listing, the buyer request creation module configured to:
generate a frequency distribution for a plurality of categories of existing buyer request listings containing description information matching at least in part the item description; and
select the listing category based on a category having a highest frequency in the frequency distribution for the plurality of categories;
a buyer request searching module executable by the one or more processors to locate the buyer request listing corresponding to a search criteria; and
a buyer request response module executable by the one or more processors to add a response to the buyer request listing, the response comprising a reference to a listing for an item offered for sale on the system.

2. The system according to claim 1, further comprising:
a buyer request category module to recommend the listing category based on information contained within the buyer request listing.

3. The system according to claim 1, further comprising:
a buyer request posting module to post the buyer request listing created by the buyer request creation module; and
a buyer request deletion module to delete the buyer request listing.

4. The system according to claim 1, wherein the buyer request listing includes:
a title;
an item description; and
buyer identification information.

5. The system according to claim 4, wherein the buyer request listing further comprises one or more responses generated by the buyer request response module.

6. The system according to claim 4, wherein the buyer request listing further comprises photographs and attribute information for a wanted item.

7. The system according to claim 4, wherein the buyer request category module is to generate a frequency distribution for categories of existing buyer request listings containing description information matching the item description.

8. The system according to claim 7, wherein the buyer request listing is automatically posted to the listing category.

9. The system according to claim 7, wherein the listing category is presented to the buyer as a proposed listing category for the buyer request listing.

10. The system according to claim 1, wherein the item offered for sale on the system comprises a listing for an on-line auction.

11. A method comprising:
receiving, at a server, a buyer request listing for a wanted item to be purchased using the server;
automatically determining a listing category for the buyer request listing using a title and an item description thereof, by:
generating a frequency distribution for a plurality of listing categories, maintained by the server, of existing buyer request listings containing description information matching the item description information;
selecting the listing category based on the listing category having a highest frequency in the frequency distribution for the plurality of listing categories; and
posting, at the server, the buyer request listing into the listing category.

12. The method according to claim 11, further comprising:
receiving responses to the buyer request listing, where each of the responses references an item that is already offered for sale on the server; and
at the server, facilitating a purchase of an item that was provided in one of the responses to the buyer request listing.

13. The method according to claim 12, wherein the item that is already offered for sale on the server is available as part of an on-line auction.

14. The method according to claim 12, wherein the item that is already offered for sale on the server is available at a fixed price.

15. The method according to claim 11, further comprising:
automatically deleting the buyer request listing from a database accessible by the server after a predetermined period time.

16. The method according to claim 11, wherein the buyer request listing further comprises one or more responses.

17. The method according to claim 11, wherein the buyer request listing further comprises photographs and attribute information for the wanted item.

18. A non-transitory machine-readable medium including a set of instructions that, when executed by a machine, cause of the machine to perform a method for providing buyer request listings within a server, the method including:
creating a buyer request listing for a wanted item to be purchased using the server;
automatically determining a listing category for the buyer request listing using a title and an item description thereof, by:
generating a frequency distribution for a plurality of listing categories of existing buyer request listings containing description information matching the item description information and
identifying the listing category as having a highest frequency in the frequency distribution for the plurality of listing categories; and
posting the buyer request listing to the listing category.

19. The non-transitory machine-readable medium according to claim 18, wherein the method further includes:
receiving responses to the buyer request listing, where each of the responses references an item that is already offered for sale on the server; and
facilitating a purchase by a buyer of an item that identified in one of the responses to the buyer request listing.

20. The non-transitory machine-readable medium according to claim 18, wherein the method further includes:
automatically deleting the buyer request listing from a database after a predetermined period time.

* * * * *